(No Model.)

W. H. H. DAVIS.
WASTE PIPE COUPLING.

No. 406,888. Patented July 16, 1889.

WITNESSES:
Phil. C. Dieterich.
C. Sedgwick.

INVENTOR:
W. H. H. Davis
BY Munn & Co.
ATTORNEYS.

N. PETERS, Photo-Lithographer, Washington, D. C.

UNITED STATES PATENT OFFICE.

WILLIAM H. H. DAVIS, OF PHILADELPHIA, PENNSYLVANIA.

WASTE-PIPE COUPLING.

SPECIFICATION forming part of Letters Patent No. 406,888, dated July 16, 1889.

Application filed August 15, 1888. Serial No. 282,788. (No model.)

*To all whom it may concern:*

Be it known that I, WILLIAM H. H. DAVIS, of Philadelphia, in the county of Philadelphia and State of Pennsylvania, have invented a new and Improved Waste-Pipe Coupling, of which the following is a full, clear, and exact description.

My invention relates to a coupling for connecting waste-pipes to outlets of kitchen-sinks or wash-basins, and has for its object to provide a simple, inexpensive, and efficient coupling of this character, allowing easy connection or disconnection of the waste-pipe, with economy of time, labor, and material.

The invention consists in certain novel features of construction and combinations of parts of the waste-pipe coupling, all as hereinafter described and claimed.

Reference is to be had to the accompanying drawings, forming a part of this specification, in which similar letters of reference indicate corresponding parts in all the figures.

Figure 1:
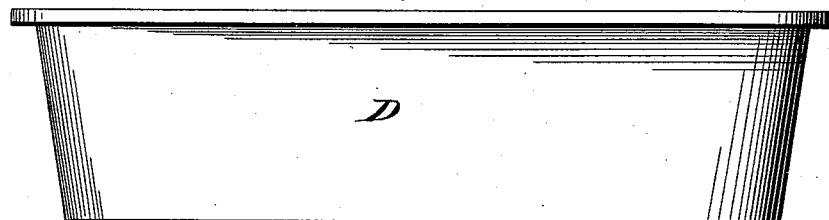
Figure 2:
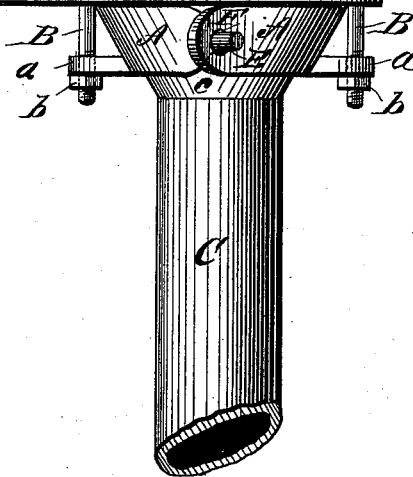
Figure 2:
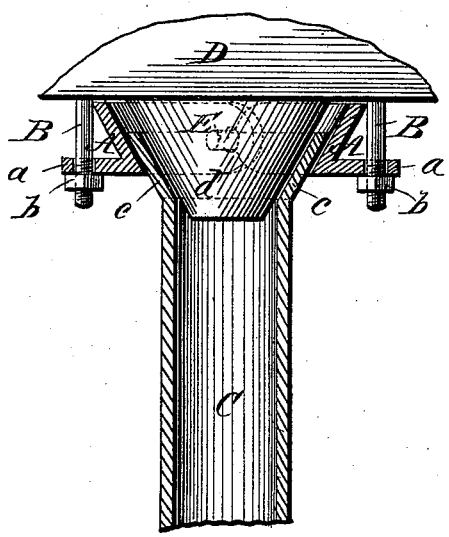
Figure 3:
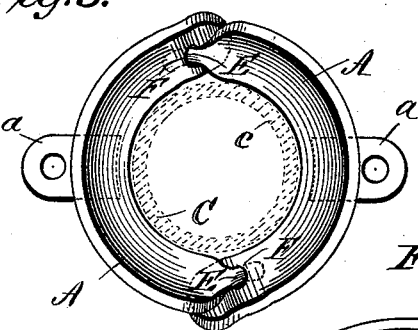
Figure 4:
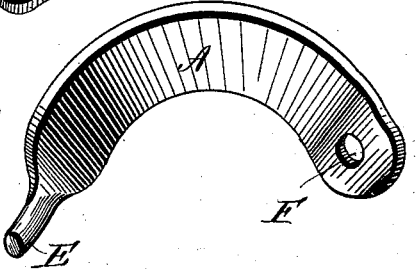

Figure 1 is a front view of an ordinary kitchen-sink with the waste-pipe connected thereto by my improved coupling. Fig. 2 is a detail view of part of the sink, and shows the waste-pipe and its coupling in transverse vertical section. Fig. 3 is a plan view of one form of the pipe-coupling, with the sink-nozzle indicated therein in dotted lines. Fig. 4 is a top perspective view of one of the two main parts of the coupling shown in the preceding views; and Fig. 5 is a plan view of a modified form of the sectional coupling, with the sink-nozzle indicated in dotted lines.

The pipe-coupling consists of two main wrought or malleable iron clamp plates or sections A A, each having a general semicircular form, and provided with a lug $a$, perforated for passage of a bolt B, by which it is held to the cupped end $c$ of a waste-pipe C, which fits the tapering nozzle $d$ of an ordinary kitchen-sink D; or it may be a wash-bowl or vessel of any character to which a waste or overflow pipe is to be connected.

In one preferred form of the coupling its opposite clamp-plates A A are each provided at one end with a pin E and at the other end with a hole F, and whereby, when the two plates are placed around the cupped end of the waste-pipe after it is adjusted to the sink or basin-nozzle, the pin E of one plate will enter the hole F on the other plate, and the pins will then be slightly bent over to lock the two clamp-plates together, whereupon the plate-lugs $a\ a$ will be slipped onto the sink-bolts B B, and the nuts $b\ b$ of the bolts will then be applied and tightened to clamp the plates A A to the cupped end $c$ of the waste-pipe C, to securely couple it to the sink or basin.

Figure 5:
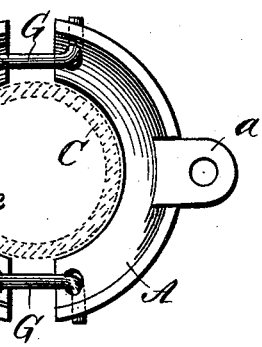

Instead of providing the opposite clamp-plates of the coupling with pins E and holes F receiving them, as above described, I may make these plates somewhat smaller than one-half the circumference of the cupped end of the waste-pipe which they are to clamp, and provide each end of each plate with a hole, to allow metal staples or wire hooks G G to be slipped into the holes to hold the pair of clamp-plates to the cupped end of the waste-pipe, and, as will be understood from Fig. 5 of the drawings, the bolts B will be used to hold this modified form of clamp-plates to the cupped end of the waste-pipe and to the sink, substantially as hereinbefore described.

The difficulties and inconveniences attending repair or renewal of waste-pipes when they are connected to a sink or basin by means of a solid clamp collar or plate surrounding their cupped ends are well known, and often require a cutting of the pipe or a reducing of its cupped end, which consumes much time and entails considerable expense, while with my improved sectional clamp-plate coupling the cupping of the waste-pipe need not be disturbed and the pipe need not be cut, and the pipe may be more conveniently cupped when being first applied to a sink, as it is not necessary to first slip the clamp-plates upon it, as must be done with the old style annular or continuous clamp-plate. The sectional or two-part clamp-plate also assures a smoother and better job.

It is manifest that a sectional or two-part clamp ring or coupler, made substantially as herein described, may be shaped to fit cupped ends of pipes having oval, rectangular, or other form; hence I am not limited to the semicircular or rounded form of the clamp-plates.

Having thus described my invention, what I claim as new, and desire to secure by Letters Patent, is—

A waste-pipe coupling consisting of two clamp-plates A A, each provided with a pin E and hole F, and adapted for connection, substantially as specified, and provided with holes to receive bolts for holding them to the waste-pipe and holding the waste-pipe to a sink or basin, substantially as shown and described.

WILLIAM H. H. DAVIS.

Witnesses:
 CARROLL R. WILLIAMS,
 FRANK M. BURNS.